May 30, 1967 J. R. GRASSO 3,322,603
HEAT SEALING HAND TOOL
Filed April 20, 1964 4 Sheets-Sheet 1
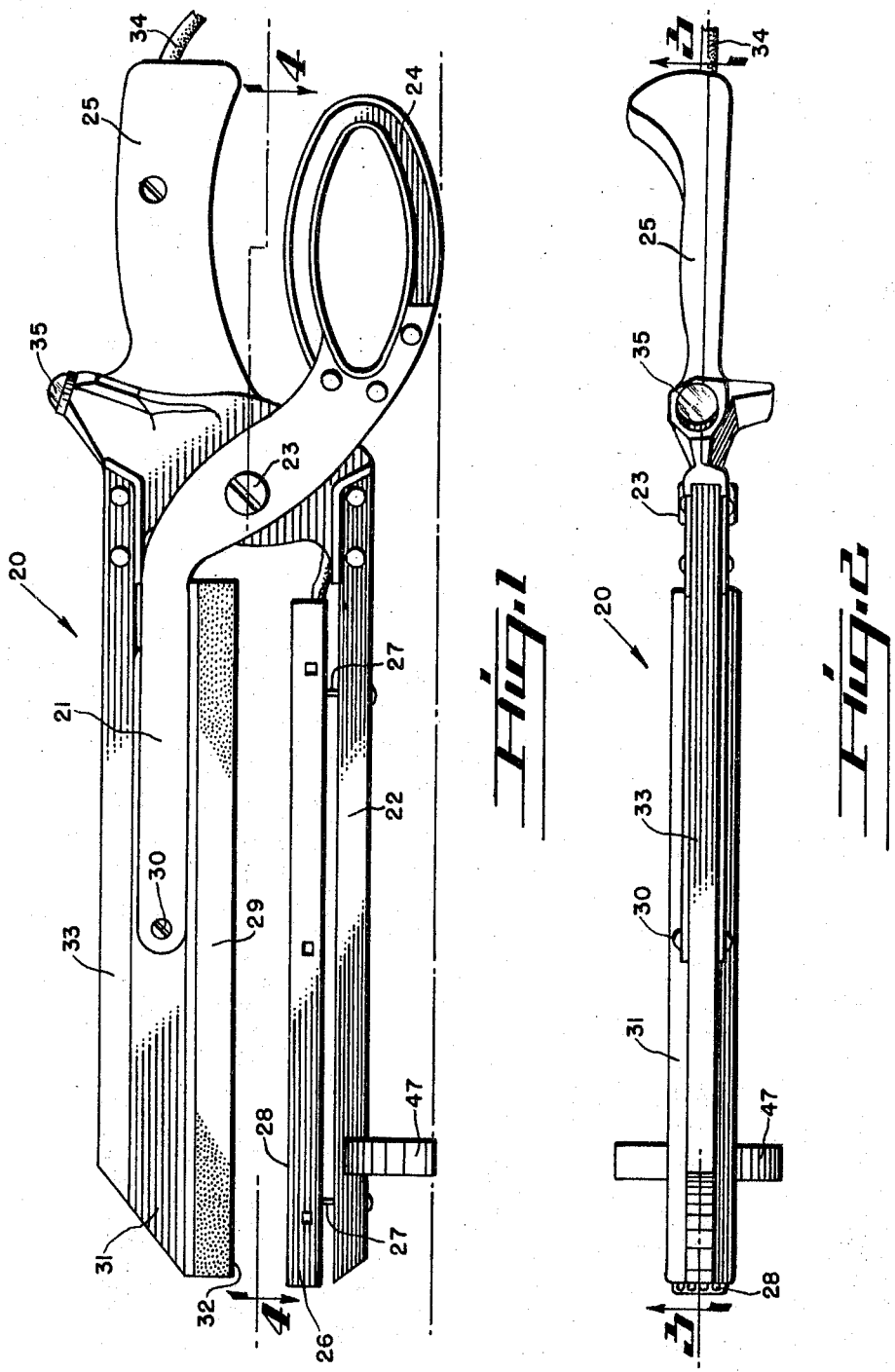
INVENTOR.
JOSEPH R. GRASSO
BY
*Kinney and Schenk*
ATTORNEYS

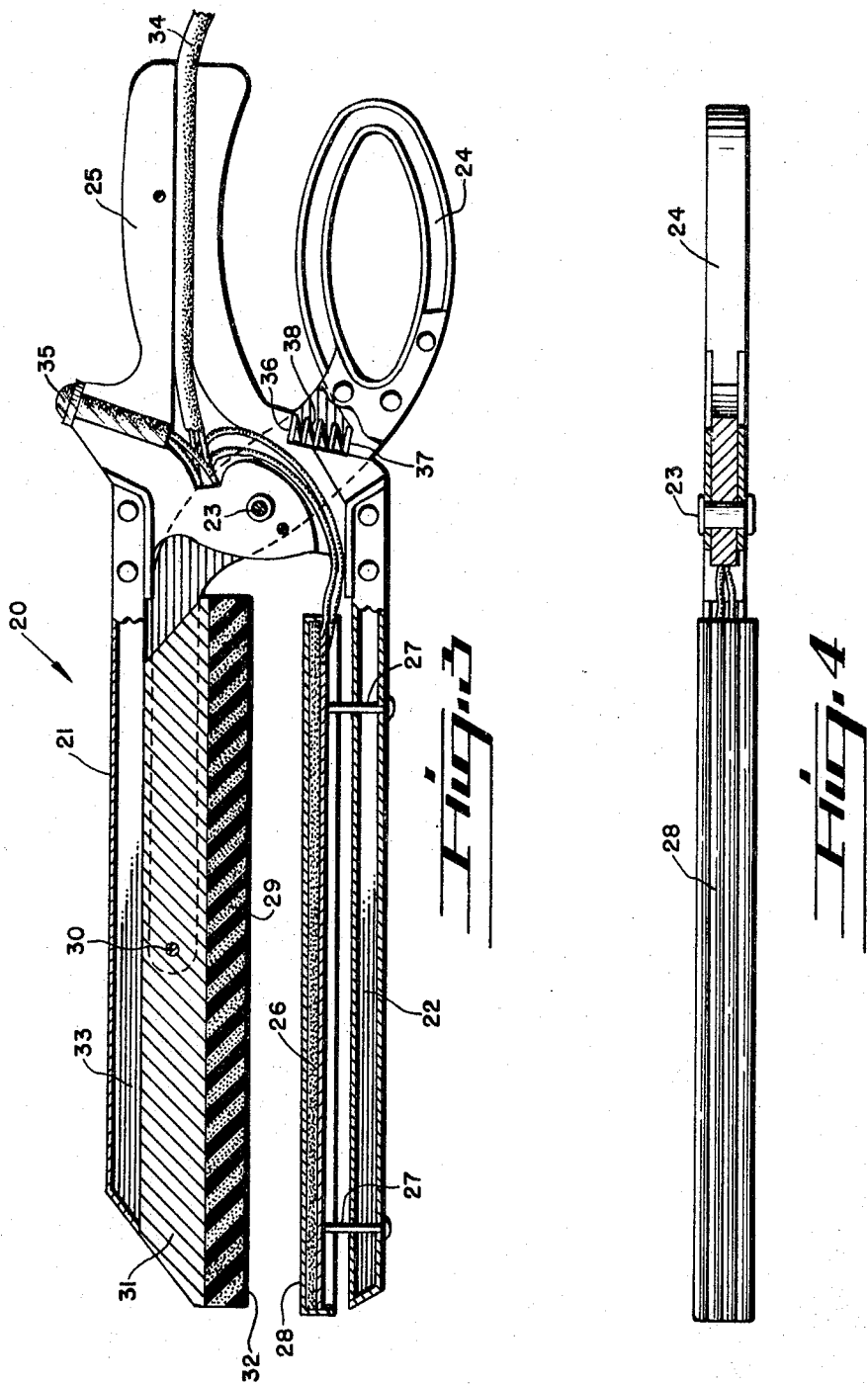

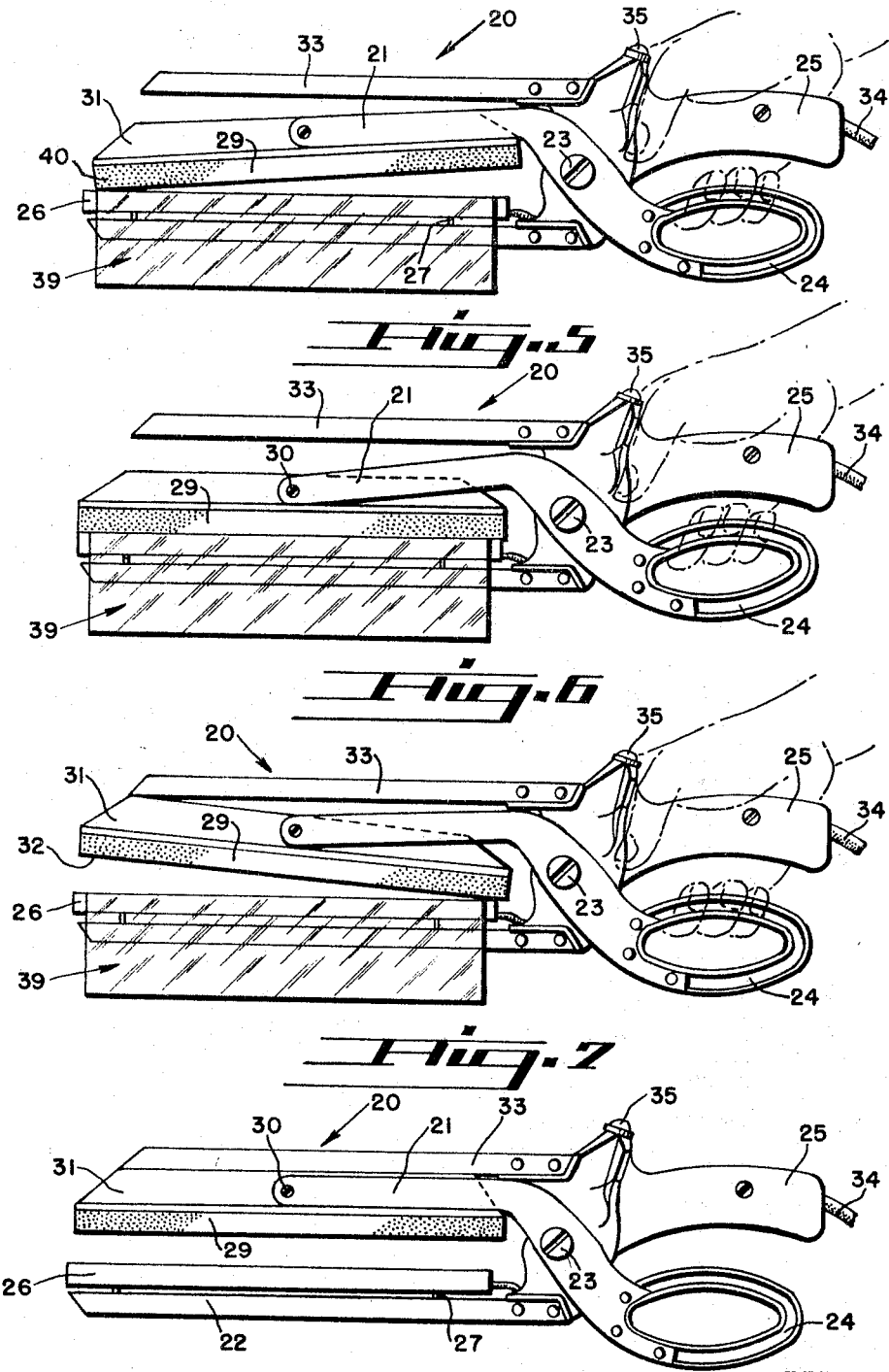

May 30, 1967 J. R. GRASSO 3,322,603
HEAT SEALING HAND TOOL
Filed April 20, 1964 4 Sheets-Sheet 4

INVENTOR.
JOSEPH R. GRASSO
BY
*Kenney and Schenk*
ATTORNEYS

United States Patent Office 3,322,603
Patented May 30, 1967

3,322,603
HEAT SEALING HAND TOOL
Joseph R. Grasso, 8458 Wuest, Cincinnati, Ohio 45239
Filed Apr. 20, 1964, Ser. No. 360,997
3 Claims. (Cl. 156—579)

This invention relates to an improved heat sealing means and method.

It is well known that various grocery items are heat sealed in transparent, heat sealable material for display in the merchandising cases or the like.

However, no suitable means have been provided for satisfactorily permitting the housewife or the like to preserve food in the home in much the same manner that the food is preserved in grocery stores or the like in the above manner.

According to the teachings of this invention, however, an improved heat sealing hand tool is provided wherein the housewife or the like can effectively heat seal food products and the like in bags of selected lengths so that the food can be effectively stored until utilized.

For example, the housewife can heat seal any particular food item in a bag-like, heat sealable material in a manner hereinafter described whereby the sealed product can be stored in the freezer or the like for keeping thereof. Thereafter, the housewife can take the entire package construction and place the same in a cooking utensil filled with boiling water or the like so that the item packaged in the heat sealable material will be cooked directly in the packaging material thereof without the loss of flavor or dilution thereof by the cooking medium.

The above features of applicant's invention are provided by a simple and inexpensive hand tool uniquely arranged in a manner hereinafter set forth to effectively permit the housewife to heat seal any desired object in a heat sealable packaging material in a simple and non-time-consuming manner.

In particular, the heat sealing hand tool of this invention comprises a pair of pivotally mounted members respectively having handle portions so constructed and arranged that the handle portions can be readily grasped by one hand of the housewife or the like and be drawn toward each other to cause the members to be drawn toward each other and heat seal heat sealable material disposed therebetween.

After the material has been heat sealed in the above manner, the housewife or the like merely releases the handle portions of the tool whereby the members automatically spread apart to permit removal of the heat sealable material from the tool.

Accordingly, it is an object of this invention to provide an improved heat sealing hand tool having one or more of the novel features of this invention as set forth above or hereinafter shown or described.

Another object of this invention is to provide an improved method of heat sealing material or the like.

Other objects, uses and advantages of this invention are apparent from a reading of this description, which proceeds with reference to the accompanying drawings forming a part thereof and wherein:

FIGURE 1 is a side view of the improved hand tool of this invention with the pivotally mounted members thereof in an open position.

FIGURE 2 is a top view of the structure illustrated in FIGURE 1.

FIGURE 3 is a view similar to FIGURE 1, except that certain parts thereof are shown in cross section, FIGURE 3 being taken on line 3—3 of FIGURE 2.

FIGURE 4 is a cross-sectional view taken on line 4—4 of FIGURE 1.

FIGURES 5 through 8 are respectively views similar to FIGURE 1 and illustrate the various steps in the method of this invention.

Figure 9:
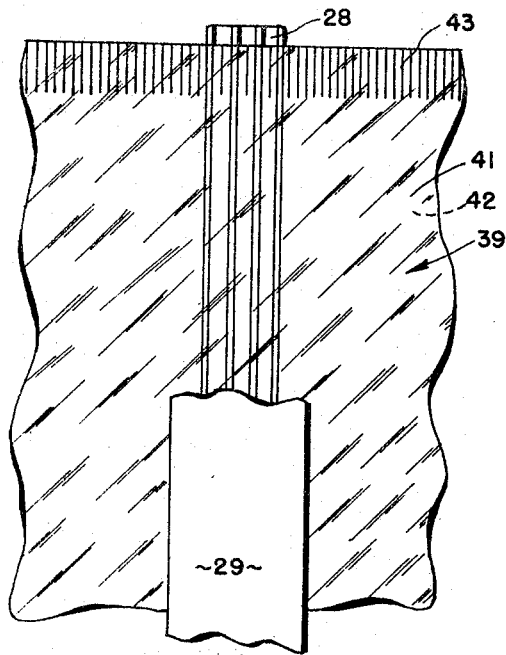
FIGURE 9 is a broken-away, fragmentary, top view illustrating the method of positioning the hand tool relative to the heat-sealable material.

While the various features of this invention are hereinafter described and illustrated as being particularly adaptable for providing a hand tool for a housewife or the like, it is to be understood that the various features of this invention can be utilized singly or in any combination thereof to provide other devices as desired.

Therefore, this invention is not to be limited to only the embodiments illustrated in the drawings, because the drawings are merely utilized to illustrate one of the wide variety of uses of this invention.

Referring now to FIGURE 1, the improved heat sealing hand tool of this invention is generally indicated by the reference numeral 20 and comprises a first member 21 and a second member 22 pivotally mounted together by a pivoting means 23 in any suitable manner, the members 21 and 22 respectively having handle portions 24 and 25 extending to the right of the pivot means 23 so that the handle portions 24 and 25 can be readily grasped by one hand of a housewife or the like and moved toward each other in a conventional scissors operating manner to move the members 21 and 22 toward each other for a heat sealing purpose hereinafter described.

The member 22 of the hand tool 20 carries a heating element 26 disposed spaced from the member 22 by fastening means 27, the heating element 26 being disposed between the members 21 and 22 for a purpose hereinafter described and having a substantially flat heat sealing surface 28 which can be embossed in any suitable manner, as will be apparent hereinafter.

The member 21 pivotally carries a resilient pad 29 by pivoting means 30, the resilient pad 29 being effectively interconnected to a substantially rigid backing member 31 and having a substantially flat outer surface 32 cooperable with the surface 28 of the heating element 26 for a purpose hereinafter described.

The member 22 of the hand tool 20 carries a guide bar 33 which cooperates with the backing member 31 of the resilient pad 29 to hold the same in its aligned position, illustrated in FIGURE 1, in a manner hereinafter described.

The power means for energizing the heating element 26 comprises power lead means 34 passed through the handle portion 25 of the member 22 in the manner illustrated in FIGURE 3. The heating element is interconnected to an indicating light 35 extending from the handle portion 25 of the member 22 so that when the heating element 26 is being supplied electrical current the light 35 is on. However, when the heating element 26 is not being supplied electrical current, the indicating light 35 is not energized.

If desired, a suitable thermostat means can be provided in the hand tool 20 so that when the heating element 26 heats up to predetermined temperature the supply of electrical current thereto is terminated until the heating element 26 again falls below the predetermined temperature.

In this manner, once the housewife or the like plugs in the lead 34 to a particular outlet or the like, the heating element 26 begins to heat up to a predetermined temperature and will remain at that predetermined temperature by the automatic thermostatic means. Thus, as long as the heating element 26 is below the desired temperature, the housewife will notice that the indicating light 35 is on and that the hand tool 20 should not be utilized until the light 35 goes out.

The handle portion 25 of the member 22 of the hand tool 20 has a shoulder portion 36, as illustrated in FIGURE 3, and disposed opposite a shoulder portion 37 of the handle portion 24 of the member 21 whereby a compression spring 38 is disposed between the shoulder portions 36 and 37 to continuously urge the handle portions 24 and 25 apart so that the members 21 and 22 will normally assume the position illustrated in FIGURE 1. However, the spring 38 is so constructed and arranged that the housewife or the like can readily move the handle portions 24 and 25 toward each other in opposition to the force of the compression spring 38 whereby the compression spring 38 will return the handle portions to the position illustrated in FIGURE 1 when the handle portions 24 and 25 have been released.

The operation of the hand tool 20 of this invention will now be described.

First, assuming that the hand tool 20 has the heating element 26 thereof heated to the desired temperature, the housewife or the like disposes the heat sealable material 39 between the resilient pad 29 and the heating element 26 when the same are disposed in the open position in the manner illustrated in FIGURE 1.

Thereafter, the housewife or the like grasps the handle portions 24 and 25 in the manner illustrated in FIGURE 5 and pulls the handle portions 25 and 24 toward each other, whereby the forward end 40 of the resilient pad 29 moves downwardly to push the heat sealing material 39 flat against the surface 28 of the heating element 26. Further movement of the handle portions 24 and 25 toward each other causes the resilient pad 29 to right itself and evenly press the heat sealable material 39 against the surface 28 of the heating element 26 in the manner illustrated in FIGURE 6, whereby the heat sealable material 39 is activated by the heating element 26 to heat seal itself to the desired structure, as will be apparent hereinafter.

After the material 39 has been heat sealed in the manner illustrated in FIGURE 6, the housewife or the like releases the handle portions 25 and 24 so that the same will tend to move apart by the force of the compression spring 38 in the manner illustrated in FIGURE 7, the forward end 30 of the pad 29 first moving upwardly until the same engages the guide bar 33 whereby further movement of the handle portions 24 and 25 away from each other causes the resilient pad 29 to right itself against the guide bar 33 in the manner illustrated in FIGURE 8.

Therefore, it can be seen that the hand tool 20 of this invention can be readily utilized to heat seal heat sealable material 39 in a simple and effective manner whereby the pivoted resilient pad 29 will compress the heat sealable material 39 against the flat surface 28 of the heating element 26 throughout the length thereof.

Figure 11:
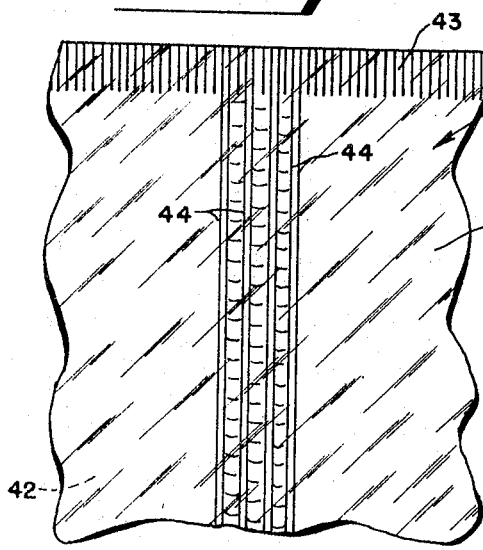
FIGURE 11 is a view similar to FIGURE 9 and illustrates the heat sealable material having been heat sealed by the device illustrated in FIGURE 9.

The heat sealable material 39 can be formed in tubular form in the manner illustrated in FIGURE 9 whereby opposed sheets 41 and 42 of the heat sealable material 39 are respectively secured together at the outer edges 43 thereof. Thus, the housewife or the like can dispose desired materials in one end of the tubular structure and transversely heat seal the same with the hand tool 20 in the manner illustrated in FIGURES 9 and 11 to effectively provide a closed bag on one side thereof. For example, the surface 28 of the heating element 26 can form the transverse heat sealing pattern 44 illustrated in FIGURE 11 whereby the housewife or the like can take an ordinary pair of scissors or the like and cut through the central portion of the heat sealing pattern 44 to provide a bag on one end and a closed end on the remaining portion. Alternately, the housewife could cut adjacent the heat seal pattern 44 to provide a closed bag on one side thereof and an open tubular structure on the other side thereof.

Figure 10:
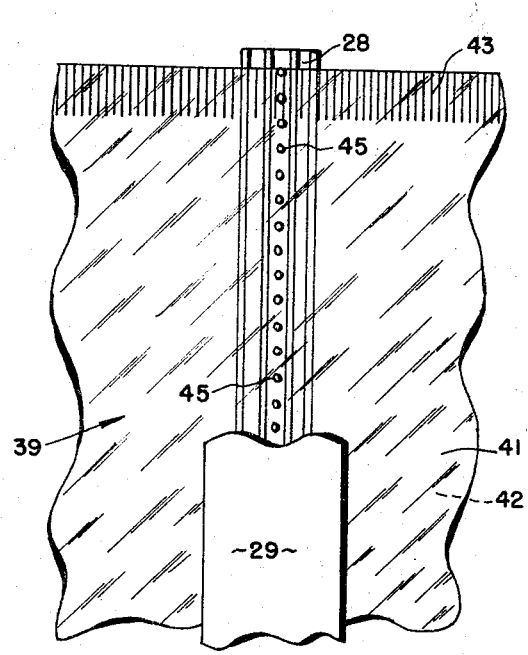
FIGURE 10 is a view similar to FIGURE 9 and illustrates another embodiment of this invention.
Figure 12:
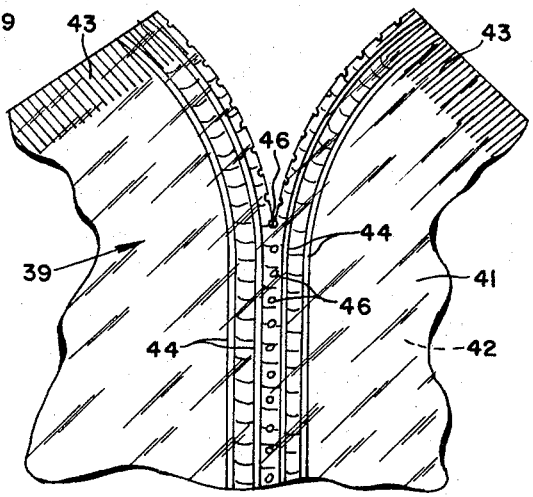
FIGURE 12 is a view similar to FIGURE 11 and illustrates the heat sealable material after the same has been heat sealed by the device illustrated in FIGURE 10.

If desired, the surface 28 of the heating element 26 can be provided with a plurality of projection means 45 in the manner illustrated in FIGURE 10, so that when the hand tool 20 is utilized in the manner illustrated in FIGURE 6 to heat seal the heat sealable material 39, the same cooperates with the resilient pad 29 to provide perforations 46 in the manner illustrated in FIGURE 12 so that the heat seal pattern 44 can be torn through the middle thereof in the manner illustrated in FIGURE 12.

In order to hold the hand tool 20 in its upright position between uses thereof, a suitable stand 47, FIGURES 1 and 2, can receive the member 22 while the handle portion 24 rests on the surface supporting the stand 47.

Therefore, it can be seen that this invention not only provides an improved hand tool for heat sealing heat sealable material or the like, but also this invention provides an improved method of heat sealing heat sealable material or the like.

While the form of the invention now preferred has been disclosed as required by the statutes, other forms may be used, all coming within the scope of the claims which follow.

What is claimed is:

1. A heat sealing hand tool comprising a pair of pivotally mounted members respectively having handle portions which cause said members to be drawn toward each other when said handle portions are moved toward each other, a first of said members carrying a heating element, a second of said members pivotally carrying a resilient pad which cooperates with said heating element to heat seal material therebetween when said members are moved toward each other by said handle portions, said second member having guide means holding said pivotally mounted pad in a fixed position relative to said second member when said members are in an opened position and spring means tending to hold said first and second members and said handle members in an opened position.

2. A heat sealing hand tool as set forth in claim 1 wherein said handle portion of said first member carries the power means for energizing said heating element.

3. A heat sealing hand tool as set forth in claim 2 wherein one of said members carries an indicating light that lights when said heating element heats and which goes out when said heating element is at a predetermined temperature.

References Cited

UNITED STATES PATENTS

| 2,441,817 | 5/1948 | Huff | 156—583 |
| 2,535,171 | 12/1950 | Sundstrom | 156—583 |
| 2,644,151 | 6/1953 | Krueger | 156—583 |
| 3,092,018 | 6/1963 | Turner | 156—583 |

FOREIGN PATENTS

| 1,035,420 | 7/1958 | Germany. |
| 887,292 | 1/1962 | Great Britain. |

EARL M. BERGERT, *Primary Examiner.*

DOUGLAS J. DRUMMOND, *Examiner.*